Figure 1:
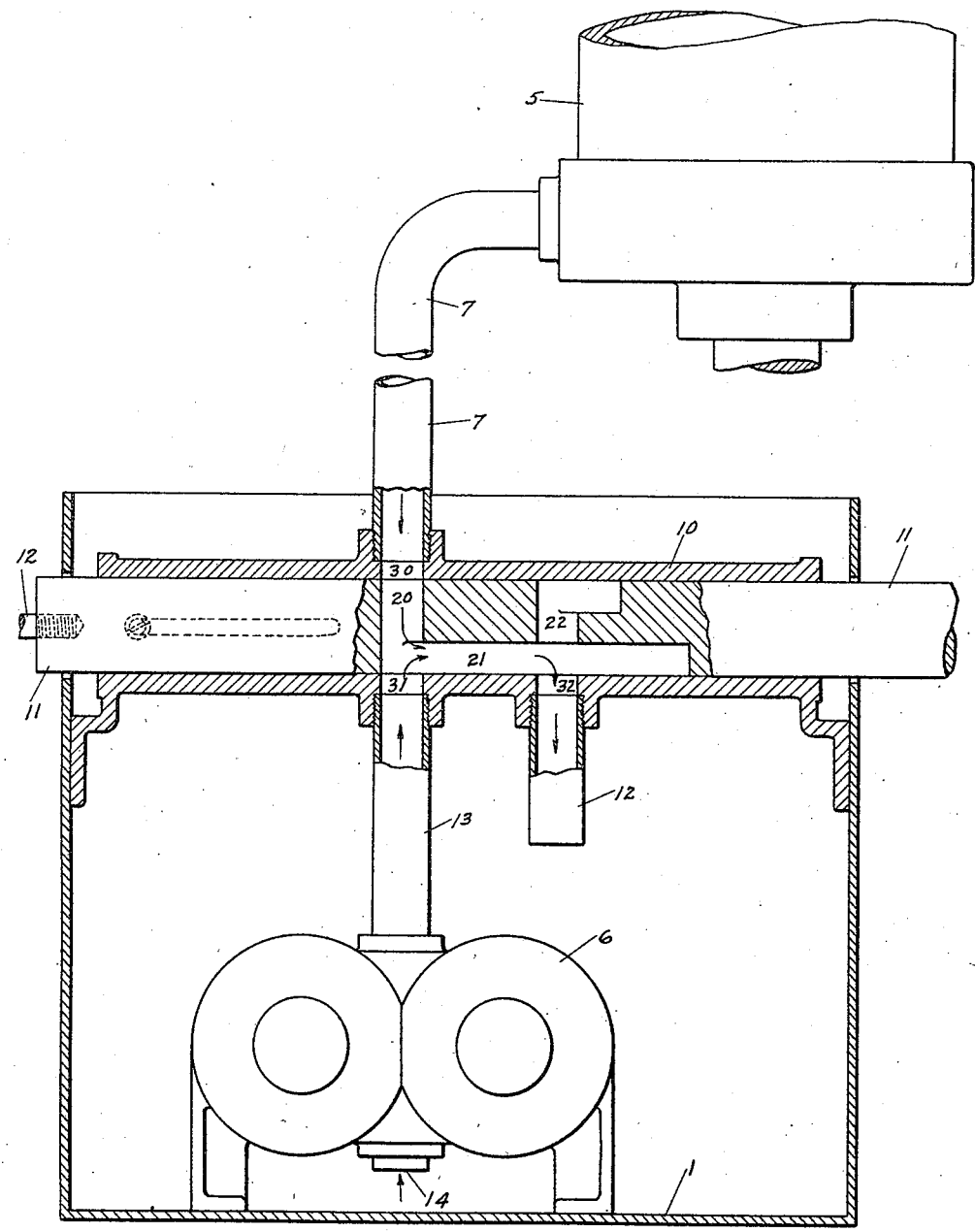

Aug. 25, 1942.  R. KVAVLE ET AL  2,293,906
HYDRAULIC CONTROL VALVE
Filed Jan. 13, 1941   2 Sheets-Sheet 1

INVENTOR
RUSSELL KVAVLE
ZENETH GREGG
ROBERT KERSLAKE
BY
G F McDougall
ATTORNEY

Aug. 25, 1942.                R. KVAVLE ET AL                2,293,906
                           HYDRAULIC CONTROL VALVE
                    Filed Jan. 13, 1941          2 Sheets-Sheet 2
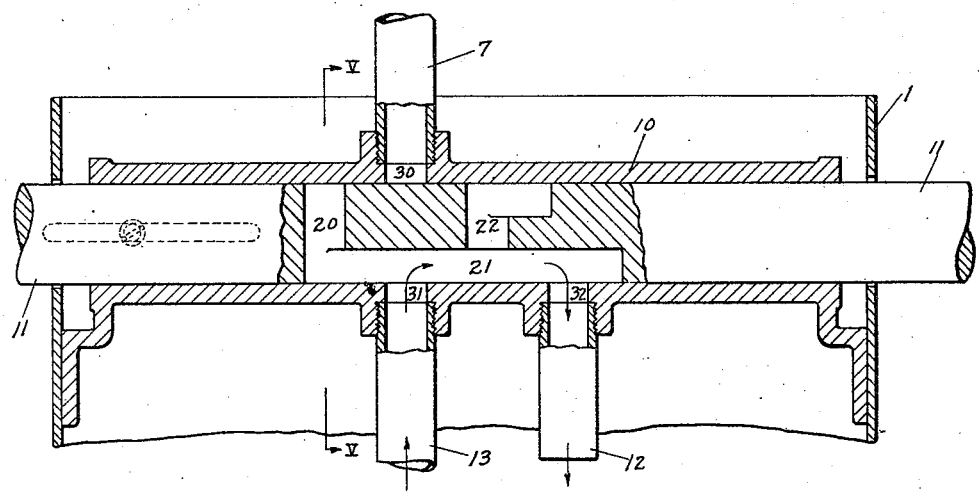
Fig. II
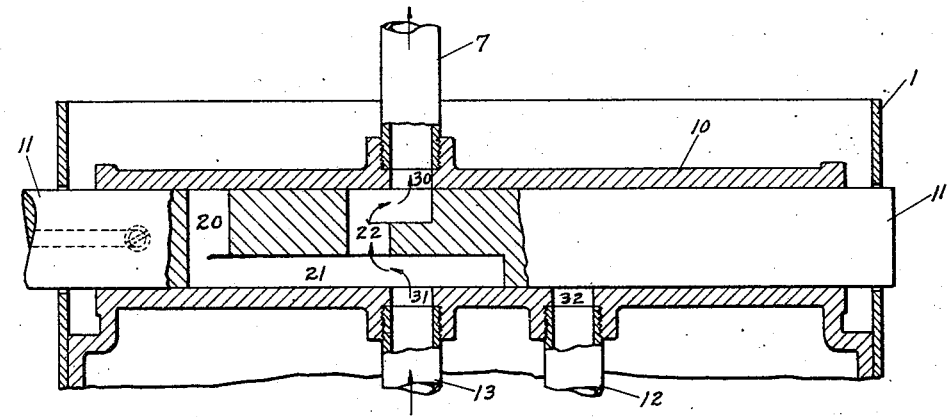
Fig. III
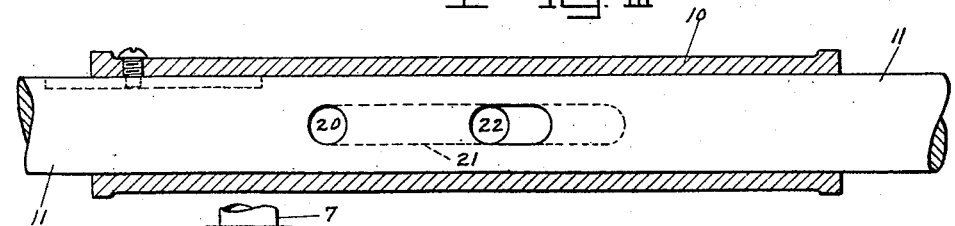
Fig. IV
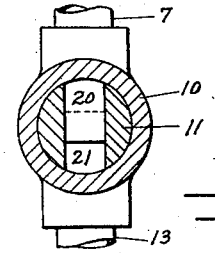
Fig. V
INVENTOR
RUSSELL KVAVLE
ZENETH GREGG
ROBERT KERSLAKE
BY G. F. McDougall
ATTORNEY Patented Aug. 25, 1942

2,293,906

UNITED STATES PATENT OFFICE 2,293,906

HYDRAULIC CONTROL VALVE

Russell Kvavle, Portland, and Zeneth Gregg and Robert Kerslake, Troutdale, Oreg.

Application January 13, 1941, Serial No. 374,262

5 Claims. (Cl. 251—76)

This invention relates to a valve for control of hydro-mechanical lift devices, such as the hydraulic lift cylinder for dump-body trucks used for bulk materials in very large numbers, for handling bulldozer blades on tractor operated graders and other devices requiring very heavy fluid pressure, necessitating the employment of a positive displacement pump.

Since pumps of the character indicated are always driven by a slide gear, engageable with the transmission of a vehicle and employing a motor many times more powerful than would be required for operating the pump alone, some provision must be made to protect the pump against even momentary blocking when shifting from active to inactive position, or destruction of the pump, transmission gears, or whatever happens to be the weakest part of the transmission system, is to be expected. Such protection is ordinarily afforded by a spring loaded fluid relief valve and that would seem to end the matter. It has been found, however, that truck drivers will not take the time to slide the gears out of mesh and disconnect the pump when they are making short hauls; and, again, this takes a few minutes of very expensive time in each case, so it is not to the advantage of the machine owner or contractor if it can be readily avoided. Pumping against the relief valve uses up power and tends in time to affect the life of the relief valve also; hence it is desirable to have a valve that has no point in its mode of operation where the pump can be hydraulically locked.

It is the principal object of the present invention to provide such a valve and also one that makes the rather expensive and cumbersome relief valve wholly unnecessary.

It is another object to provide a valve having the before mentioned · desirable qualities and which is always, additionally, in perfect balance so the handler need not overcome any hydraulic force in operating it, at any pressure within its range. Other objects will appear as the specification is read and understood and are specifically pointed out in connection with the recitation of the novel features of the invention in the claims which follow this specification.

Hydraulic cylinder lifts of the kind mentioned are often equipped with an "overflow" pipe that is a pipe or other conduit that communicates with the inside of the lift cylinder, nearly at its top; and there is a port in the cylinder wall to be uncovered by the rising piston when the same has made its maximum stroke. This will ordinarily be used with my new valve, but is no part of it and has not been shown or further described as it is so well known that no further mention is necessary. When so equipped, the valve and hoist mechanism is so constituted that no harm can come to it by reason of mishandling.

Drawings accompany and form a part of this specification, illustrating a preferred form of the invention, but while they definitely show certain structures and the description is as clear as we can make it, such illustration and description is not intended as limiting but is only for the purpose of clear descriptive matter concerning the preferred form itself.

In the drawings:

Fig. I is a vertical sectional view of our new valve, so placed with other structures as to show the relationship; the valve is set in full neutral position;

Fig. II is the same structure shown in Fig. I, save that the other structures are much reduced by breaking parts away. The control valve is the same but has been moved to a point where the lift cylinder 5, a part of which is illustrated in Fig. I, will be presumed to have lifted the load and is being held there; the rest of the apparatus and particularly the pump 6 is in neutral;

Fig. III is the same as in Fig. II, save that the valve proper is moved again to give a positive connection between the pump 6 and the lift cylinder 5, where dependence may be had on the overflow pipe mentioned hereinbefore to prevent over-lift; or of course a relief valve may be used if desired, that being a matter of choice;

Fig. IV is a view in cross-section of the control valve cylinder only in Fig. II, the valve being shown in full; the section is taken on the axis of the cylinder in Fig. II; and Fig. V is a section on the line V—V, Fig. II.

Describing the drawings in detail and commencing with the first figure. 1 is an oil reservoir or sump which may be made to contain a pump 6, submerged in its contents, as we prefer; or any otherwise be placed in any convenient and practicable location. The pump will be connected to a source of power, not shown. The pump 6 is a positive displacement pump and its delivery must be accommodated or it may be depended upon to accommodate itself.

Usefully, it delivers hydraulic fluid to the bottom of a lift cylinder 5, through the conduit 7. The bottom of the cylinder 5 is always swivelly mounted so that it can swing to the arc described by its load, such as one end of a dump-body truck. No detail of this swivel mounting has been shown since it is well known.

The pump 6 is mounted within and secured firmly to the bottom of the oil reservoir, and a control valve assembly consisting of a multi-ported valve casing 10 and a plunger type, multiported valve member 11, is movable within the casing 10 to selectively register its ports with the ports of the casing, affecting control as will be explained. The casing ports are numbered 30, 31, and 32 while the valve ports are numbered 20, 21 and 22. The valve 11 is movable within the casing 10 by manual means diagrammatically represented by the rod 12. Since the valve is here shown within the oil reservoir, no packing devices are shown at the ends, but if mounted outside, these will be used.

When the valve is in the position shown in Fig. I, pump discharge and also discharge from the lift cylinder 5 freely returns to the sump 1 as shown by the arrows. Delivery from the pump is through the pipe 13, the suction inlet of the pump being at 14. This is full neutral position and there is slight power load on the pump, hence it may run since port 20 affords free communication to discharge the lift cylinder 5 and at the same time short circuits the pump.

It may now be noted that ports 20 and 22 are cross ports that intersect the axis of the valve 11 and the port 21 is a longitudinal slot that connects the lower ends of 20 and 22, being considerably longer than would be necessary for that purpose.

The position shown in Fig. II may be either considered as a transition position, with the valve 11 moving to deliver fluid pressure to the lift cylinder 5, or a static position to hold the lift cylinder in its lifted position. Note, however, that by virtue of the longitudinal port 21, the pump is still at neutral and remains so until after the port 22 has placed it again in communication with the pipe 7, through the port 30; and there is no time when it is possible to place a hydraulic lock on the pump. As the valve moves further to the left, the limiting end of the port 21 finally seals off the discharge pipe 12 and full force of the pump is applied to the lift cylinder 5.

The procedure of lifting a load by the cylinder 5, has been described and if the cylinder is furnished with the well known overflow pipe, the pump will hold it indefinitely; or, if the load is dumped, immediate restoration to the valve position shown in Fig. I will lower the load as before.

The most valuable feature of this valve is that it provides control for a lift cylinder or similar device with a constant running, positive delivery pump; and due to the fact that there is no lap of the valve surfaces and the ports in the valve casing, the transition is without any pressure shock on the pump; and it is at once seen that the change of position can be gradual, in either direction, so that thereby a load can be lifted or lowered a minute amount at a time without either changing the speed of the pump or imposing an undue load upon it.

There is another extremely valuable function of this valve that we do not believe to be common to any other. Excavated material is often sticky and resists flowing from a dump body truck, even when it is raised to the steepest possible limit. Our valve will shake the dump body to dislodge the material. All that is necessary is to raise the body to the limit, then move the valve 11 back to the position shown in Fig. II. If moved at medium speed, there will be a sharp drop of the body when the port 21 uncovers the pipe 12, which is immediately arrested by a small further movement to approximately the position shown in Fig. II. Rapid repetition of this shaking movement cannot lock the pump nor does the shock of arresting the falling load have to be supported by the pump, but is supported by solid metal parts.

Note that by the construction of our valve, it is always in balance and little, if any more, manual effort is required to move it under high pressure than is required at neutral. It may be noted also that movement of the valve under pressure is exceedingly short, ordinarily about a quarter of an inch.

Having explained our new valve in such manner that those familiar with such fittings, can make use of it and realize its benefits, what we claim as new and desire to secure by Letters Patent, is:

1. A hydraulic control valve comprising a valve casing, provided with a delivery outlet on one side and inlet and waste outlets in spaced position on the opposite side, a valve of the plunger type movable in said casing, provided with two spaced through ports, alternately registrable with the delivery outlet and the inlet port concurrently, and also provided with a longitudinal port connecting the said through ports together and so formed that as the valve is moved in the casing a free fluid passageway is always open, either to the delivery outlet or to the waste outlet.

2. A hydraulic control valve comprising a cylindrical casing provided with a delivery connection means on one side intermediate the ends, an inlet connection means and a waste connection means on the opposite side in spaced relationship, the inlet and delivery means adapted to register by a through port in a fitted plunger, a fitted plunger movable in said casing, said plunger being provided with two through ports alternately registrable with the delivery connection means and concomitantly with the inlet connection means, the plunger also provided with a longitudinal port connecting the through ports together, of such additional length that when the plunger is moved, the inlet means in the casing is always connected to the delivery means for the waste without lap of plunger surfaces over said inlet means.

3. A hydraulic control valve comprising a valve casing, oppositely placed inlet and outlet connecting means made rigid with said casing, a waste connection means made rigid with said casing in spaced relationship to said inlet means on the same side of the casing, and a fitted plunger movable in the casing and provided with two through ports alternatively registrable with the inlet connection of the casing in such manner that the inlet opening of the casing is always in registry with either the outlet connecting means of the casing on one side thereof or with the waste connection on the other side thereof or with the waste connection on the other side without intermediate lap effective to block the inlet.

4. A hydraulic control valve comprising a cylindrical casing, inlet means and delivery means made rigid on opposite sides of the bore of said casing, a waste connection means spaced from the inlet means on the same side of the casing, a fitted plunger movable in said casing and provided with at least two through ports and a longitudinal recess connecting the through ports together and of such additional length that it connects both through ports to the waste connection means at all positions save when the inlet and delivery means are connected together by a through port in substantially wide open relationship.

5. A hydraulic control valve comprising a cylindrical casing, inlet and waste connection means made rigid with one side of the casing and outlet means made rigid with the other side of the casing opposite the inlet means, a plunger reciprocably movable in said casing and provided with two spaced through bores normal to the axis thereof and a parallel port connecting the bores together, said parallel port being of such length and size that fluid delivered to the inlet port of the casing will have free access to the outlet means or the waste means of the casing at all positions of the plunger without lapping said inlet means.

RUSSELL KVAVLE.
ZENETH GREGG.
ROBERT KERSLAKE.